United States Patent

Burkhart et al.

(10) Patent No.: US 6,414,175 B1
(45) Date of Patent: Jul. 2, 2002

(54) INNOVATIVE SILOXANE BLOCK COPOLYMERS WITH RIGID SPACERS AND THEIR USE

(75) Inventors: Georg Burkhart, Essen; Rolf-Dieter Langenhagen, Hattingen; Andreas Weier, Essen, all of (DE)

(73) Assignee: Th. Goldschmidt AGH, Essen (DE)

( * ) Notice: Subject to any disclaimer, the term of this patent is extended or adjusted under 35 U.S.C. 154(b) by 0 days.

(21) Appl. No.: 08/869,556

(22) Filed: Jun. 5, 1997

(30) Foreign Application Priority Data

Mar. 29, 1997 (DE) .......................... 197 13 279

(51) Int. Cl.[7] .................................. C07F 2/08
(52) U.S. Cl. .................. 556/445; 556/453; 556/456; 521/159; 549/215
(58) Field of Search ................ 556/445, 453, 556/456; 549/215; 521/159

(56) References Cited

U.S. PATENT DOCUMENTS 5,767,219 A * 6/1998 Takarada et al. ............. 528/29
5,908,950 A * 6/1999 Cooke et al. ................. 556/445

* cited by examiner

Primary Examiner—Paul F. Shaver
(74) Attorney, Agent, or Firm—Frommer Lawrence & Haug LLP

(57) ABSTRACT

The invention relates to block copolymers of the general average formula

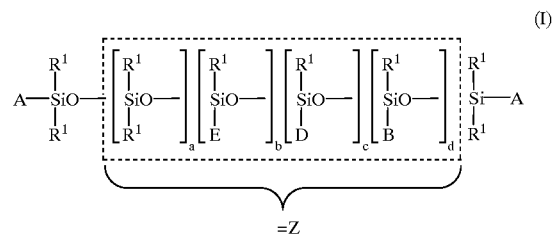

with siloxane blocks which are linked via rigid spacers, and to their use as surface-active agents.

6 Claims, No Drawings

INNOVATIVE SILOXANE BLOCK COPOLYMERS WITH RIGID SPACERS AND THEIR USE

The invention relates to block copolymers with siloxane blocks which are linked via rigid spacers and to their use as surface-active agents.

According to the prior art there are a large number of surface-active siloxane block copolymers which are used in a broad range of industrial applications. They may be either methylpolysiloxanes (see DE-C-25 33 074) or (pseudo) haloalkyl-substituted siloxanes (see DE-C-36 26 297, U.S. Pat. No. 3 952 038 or DE-A-24 02 690), which are used, for example, as cell regulators in highly elastic, cold-curing polyurethane foams. Moreover, a broad range of silicone polyether copolymers, and their use as surface-active substances, is known, as is described, for example, by way of example in the following patents:

DE-C-15 70 647: chloropolysiloxanyl sulfates are reacted with mixtures of alkylene oxide adducts which consist of from 50 to 96 OH equivalent percent of poly-alkylene glycol monoethers, which consist of ethylene oxide units and propylene oxide units and have a content of from 40 to 70% by weight of oxypropylene units and a molar weight of from 1000 to 3000, whose hydroxyl groups are preferably secondary, and from 5 to 50 OH equivalent percent of alkylene oxide adducts of poly-functional hydroxyl compounds with a molar weight of from 130 to 3500, whose polyalkylene glycol component consists of ethylene oxide units and/or propylene oxide units and which have an OH equivalent weight of up to 1750 and whose hydroxyl groups are preferably secondary, and the proportions being chosen such that there are not more than 1.4, preferably from 1.05 to 1.2, OH equivalents per acid equivalent of the chloropolysiloxanyl sulfate.

DE-C-16 94 366: Use is made as foam stabilizers of polysiloxane-polyoxyalkylene block copolymers whose polysiloxane block has a conventional composition but whose polyoxyalkylene block consists of from 25 to 70% by weight of a polyoxyalkylene having an average molecular weight of from 1600 to 4000 and an ethylene oxide content of from 20 to 100% by weight, the remainder being propylene oxide and, if desired, higher alkylene oxides, and from 30 to 75% by weight of a polyoxyalkylene having an average molecular weight of from 400 to 1200 and an ethylene oxide content of from 65 to 100% by weight, the remainder being propylene oxide and, if desired, higher alkylene oxides.

DE-A-25 41 865: The polysiloxane-polyoxyalkylene block copolymers are defined with respect to their polyoxyalkylene blocks such that one polyoxyalkylene block has a mean molar weight of from 900 to 1300 and consists to the extent of from 30 to 55% by weight of ethylene oxide, the remainder being propylene oxide, and the other polyoxyalkylene block has a mean molar weight of from 3800 to 5000 and consists to the extent of from 30 to 50% by weight of ethylene oxide, the remainder being propylene oxide.

EP-A-0 275 563: The block copolymer described in this patent application comprises three different polyoxyalkylene blocks, namely a block containing from 20 to 60% by weight of oxyethylene units, at a molar weight of from 3000 to 5000, a further block with from 20 to 60% by weight of oxyethylene units and a molar weight of from 800 to 2900, and a third block comprising only polyoxypropylene units and having a molar weight of from 130 to 1200.

In addition, the patent literature describes siloxane block copolymers which are employed as emulsifiers and in which both polyoxyalkylene groups and long-chain alkyl groups are attached to linear polysiloxanes (see for example U.S. Pat. No. 3,234,252, U.S. Pat. No. 4,047,958 or DE-C-34 36 177).

Further patent documents (e.g. U.S. Pat. No. 5,136,068, EP-A-0 381 318 and EP-A-0 529 847) describe surface-active siloxane block copolymers, for use as emulsifiers, in which polyoxyalkylene radicals and long-chain alkyl radicals are attached to the polysiloxane and there is additional linking of the siloxane block copolymer via a divalent organic radical. The feature of the siloxane block copolymers described is that linking is in every case obtained by reaction of SiH groups with, for example, diolefins, divinylbenzene or 1,3-divinyltetramethyldi-siloxane. In the course of such a reaction, moveable bridging links (spacers) are formed.

Despite the large number of different active substances obtainable in this way, the complexity of the applications (nonhomogeneous, in some cases multiphase combinations of raw materials in multivariant compositions for applications which have not been fully rationalized, such as cosmetics, emulsion technology, multiphase polymerization, etc.) dictates the necessity of searching for further improved structures. An example of such an optimization requirement for additives having surface-active properties is the production of polyurethane foams. This optimization requirement results, on one hand, from the large number of possible polyurethane foam types, for example flexible foam, rigid foam, ester foam, cold-cure foam, packaging foam, flame-laminable foam, molded foam, integral foam, etc., and on the other hand also from recent foaming techniques, such as variable pressure foaming, foaming techniques using pressurized inert gases, or forced cooling processes (e.g. ENVIRO-CURE, CRAIN INDUSTRIES).

Surprisingly it has now been found that the introduction of rigid spacers between spatially separate siloxane blocks in a molecule produces astonishing effects in a variety of performance tests.

The present invention provides innovative structures whose feature is that within one molecule siloxane blocks are attached via a rigid spacer. The distance thus established between the siloxane units is therefore not, as in the case of simple linear or nonpolycyclic structures, variable as a result of the free mobility ("flexibility") of the bond. For synthesizing the novel structures, the use of 2,5-norbornadiene (bicyclo[2.2.1]hepta-2,5-diene) has proven particularly suitable. Accordingly, the claimed structures feature linking of siloxane blocks via

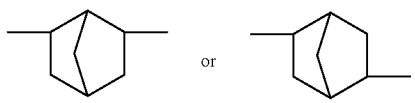

which is expressed below by the device

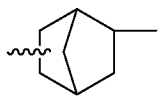

The invention therefore provides block copolymers of the general average formula:

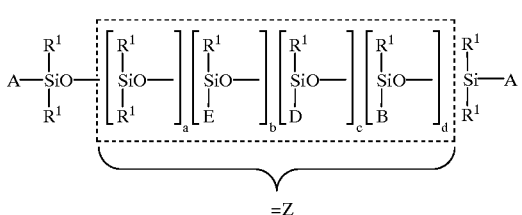
(I)

where the radicals and indices have the following meaning:
A=radical $R^1$, radical E or a radical of the formula IIa

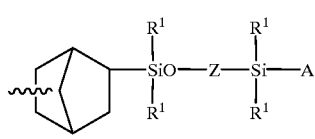
(IIa)

or a radical of the formula IIb

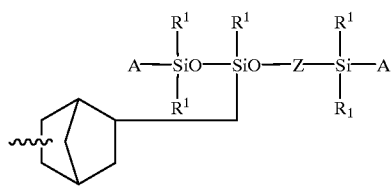
(IIb)

B=radical of the formula IIa or IIb
D=radical of formula

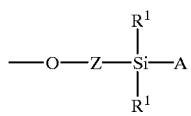

$R^1$=an alkyl radical having 1 to 30 carbon atoms, a substituted alkyl radical, an optionally substituted aryl radical or an optionally substituted alkaryl radical, with at least 80% of the radicals $R^1$ being methyl groups,
a is from 3 to 200,
b is from 0 to 50,
c is from 0 to 10 and
d is from 0 to 5, it being possible for the values of a, b, c and d in the individual segments Z of the radicals A, B and D to be different,
E=radical which is
a) a radical of the general formula

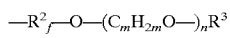

where
$R^2$ is a divalent alkyl radical, which can also be branched, and
f is 0 or 1,
m is on average 2 to 4,
n is from 0 to 100 and
$R^3$ is a hydrogen radical, an optionally substituted alkyl radical having 1 to 6 carbon atoms, an acyl radical or a radical —O—CO—NH—$R^4$ in which $R^4$ is an optionally substituted alkyl or aryl radical, and/or
b) has the meaning of an epoxy-functionalized alkyl substituent which optionally contains heteroatoms, and/or
c) has the meaning of a mono-, di- and trihydroxyalkyl substituent which can also be aromatic or branched and partially or completely etherified or esterified, and/or
d) has the meaning of a halo- or pseudohalo-substituted alkyl, aryl or aralkyl radical which optionally can also be branched,
with the proviso that at least one radical of the formula IIa or IIb is present in the molecule.

In this context it is also possible to employ various substituents in combination, as described, for example, in DE-C-42 29 402 for polyether substituents. The substituents may optionally be different, for example in their molar mass, in the case of polyethers possibly in their end group $R^3$, or in the proportions of the monomers used, in the nature of the monomers, etc.

The bridging link (spacer)

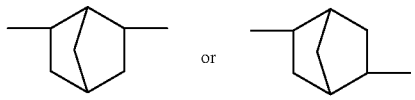

between the siloxane segments is formed by the reaction of 2,5-norbornadiene with SiH groups. Per molecule of the novel substances there must be at least one radical

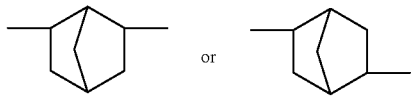

The molecule obtained by linking ought to contain $\leq 600$ Si atoms.

Those knowledgeable in the art are aware that the molecules obtained represent a mixture with a distribution given mainly by statistical rules. The values for a, b, c, d, n and the number of the radicals

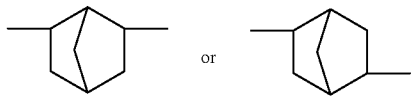

per molecule therefore correspond to mean values.

A small proportion of the radicals $R^1$ can be a hydrogen radical, specifically when the hydridosiloxanes employed do not react completely with the olefinically unsaturated compounds employed (e.g. allyl polyethers, olefins, allyl glycidyl ether, etc.) and with the 2,5-norbornadiene.

Depending on the desired application, various ranges are preferred from the group of the claimed compounds:

For applications in connection with the preparation of flexible polyurethane slabstock foams, for example, preference is given to compounds where b>3 and 5<(a+c+d)/b<20, but particular preference is given to products having an average m in the molecule of 2.3<m<3.1, and very particular preference to products having an average m in the molecule of 2.5<m<2.8.

For application in connection with the preparation of rigid polyurethane foam or polyurethane ester foam, preferred compounds are those having an average n in the molecule of n<28, and particularly preferred compounds are those having an average m in the molecule of m<2.5, and very particularly preferred compounds are those having an average quotient (a+c+d)/b in the molecule of (a+c+d)/b<8.

For applications in connection with the preparation of cold-cured molded foams, preferred compounds are those having an average b in the molecule of b<5 and particularly preferred compounds are those having an overall number of radicals E<7.

For applications in cosmetics or as emulsifier, compounds are preferred in which at least 60% of the radicals $R^3$ are hydrogen radicals; particular preference is given to compounds in which at least 80% of the radicals $R^3$ are hydrogen radicals and very particular preference is given to compounds in which all radicals $R^3$ are hydrogen radicals and the average value of m in the molecule is less than 2.3.

For applications as an additive in the paints and coatings field, preference is given to those compounds in which at least 80% of the radicals $R^3$ are hydrogen radicals. Particular preference is given to those compounds in which the radical E has the meaning of an epoxy-functionalized alkyl substituent.

There follows a list of examples of the polysiloxane block copolymers linked in accordance with the invention, in each of which only one linkage site is shown, for clarity.

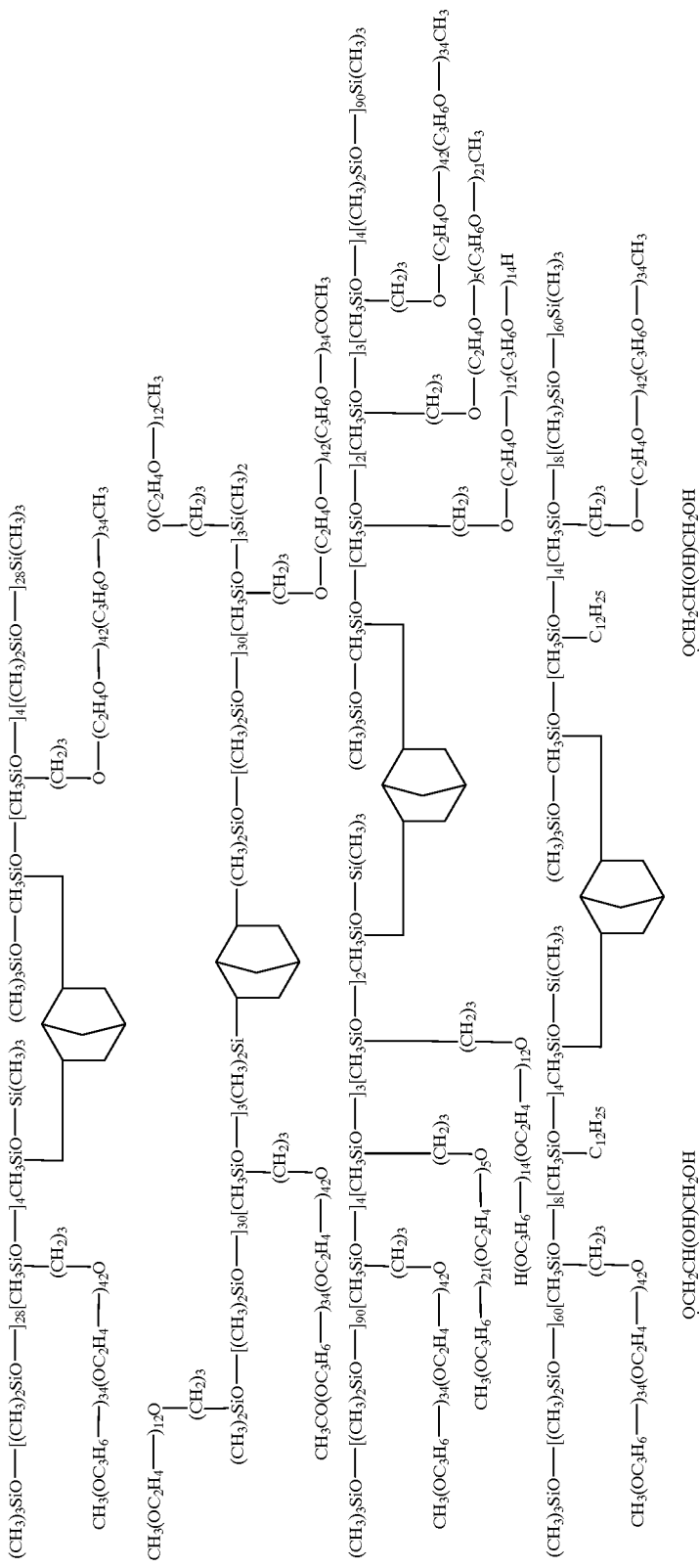

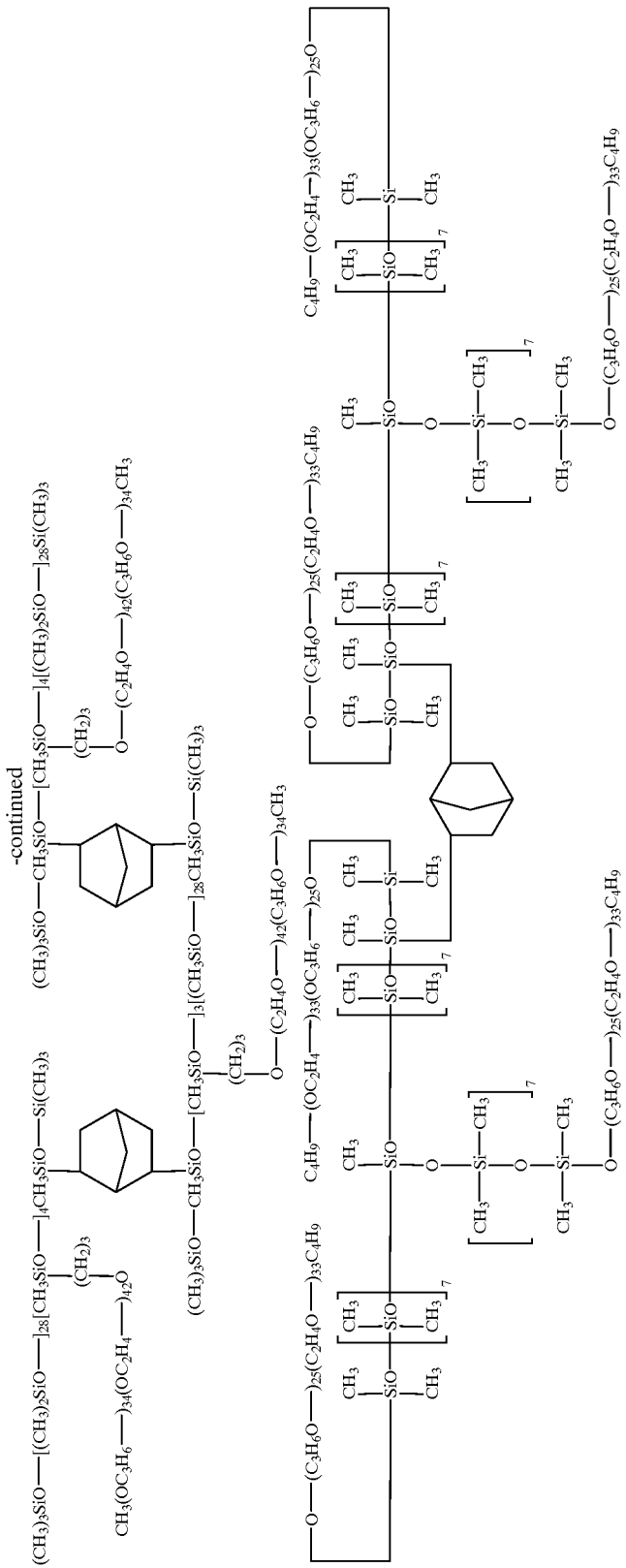

In the text below, the preparation of the novel siloxane block copolymers is described by way of example. The reactions can also be carried out in solvents, especially when highly viscose products are formed.

Preparation of Block Copolymer 1

| | |
|---|---|
| 120.6 g (0.0250 mol) | of siloxane having the following average composition $(CH_3)_3SiO-[(CH_3)_2SiO-]_{58}[(CH_3)HSiO-]_6-Si(CH_3)_3$, |
| 9.3 g (0.0156 mol) | of polyether having the following average composition $CH_2=CH-CH_2O-(C_2H_4O-)_{12}CH_3$, |
| 70.8 g (0.0469 mol) | of polyether having the following average composition $CH_2=CH-CH_2O-(C_2H_4O-)_5(C_3H_6O-)_{21}CH_3$, |
| 377.3 g (0.0938 mol) | of polyether having the following average composition $CH_2=CH-CH_2O-(C_2H_4O-)_{45}(C_3H_6O-)_{34}CH_3$ and |
| 1.2 g (0.0125 mol) | of 2,5-norbornadiene | are charged to a flask which is fitted with stirrer, thermometer, gas inlet and reflux condenser. Nitrogen is passed through the apparatus, and the contents of the flask are heated to 90° C. with thorough stirring. Then 0.4 g of a 10% strength solution of $H_2PtCl_6.6H_2O$ in i-propanol is added to the batch. A slightly exothermic reaction ensues. The batch is left to continue reacting. After 2.5 h the SiH conversion is 98.7% (determined from elimination of hydrogen with n-butanol in an alkaline medium). A clear yellow product is obtained having a viscosity of 3140 mPa s. The resulting block copolymer 1 has the following average composition:

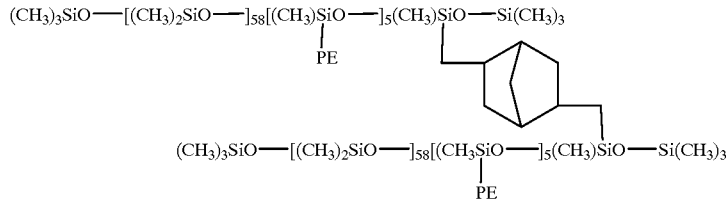

The radical PE is to the extent of

10% the radical $-(CH_2)_3O-(C_2H_4O-)_{12}CH_3$ and

30% the radical $-(CH_2)_3O-(C_2H_4O-)_5(C_3H_6O-)_{21}CH_3$ and

60% the radical $-(CH_2)_3O-(C_2H_4O-)_{45}(C_3H_6O-)_{34}CH_3$.

Preparation of Block Copolymer 2

| | |
|---|---|
| 120.6 g (0.0250 mol) | of siloxane having the following average composition $(CH_3)_3SiO-[(CH_3)_2SiO-]_{58}[(CH_3)HSiO-]_6-Si(CH_3)_3$, |
| 21.5 g (0.0146 mol) | of polyether having the following average composition $CH_2=CH-CH_2O-(C_2H_4O-)_{16}(C_3H_6O-)_{12}CH_3$, |
| 121.2 g (0.0803 mol) | of polyether having the following average composition $CH_2=CH-CH_2O-(C_2H_4O-)_5(C_3H_6O-)_{21}CH_3$, |
| 58.9 g (0.0146 mol) | of polyether having the following average composition $CH_2=CH-CH_2O-(C_2H_4O-)_{45}(C_3H_6O-)_{34}CH_3$, |
| 145.9 g (0.0364 mol) | of polyether having the following average composition $CH_2=CH-CH_2O-(C_2H_4O-)_{45}(C_3H_6O-)_{34}H$, |
| 1.5 g (0.0166 mol) | of 2,5-norbornadiene and |
| | 500 ml of toluene | are charged to a flask which is fitted with stirrer, thermomenter, gas inlet and reflux condenser. Nitrogen is passed through the apparatus, and the contents of the flask are heated to 90° C. with stirring. Then 0.35 g of 10% strength solution of $H_2PtCl_6.6H_2O$ in i-propanol is added to the batch. A slightly exothermic reaction ensues. The batch is left to continue reacting. After 4 h the SiH conversion is 99.2% (determined from elimination of hydrogen with n-butanol in an alkaline medium). The overhead stream of nitrogen is then ended and the reflux condenser is swapped for a distillation attachment. Volatile constituents are distilled off at a temperature of 80° C. under a vacuum of about 20 mbar. There remains a clear, yellow product having a viscosity of 11200 mPa s. The resulting block copolymer 2 has the following average composition:

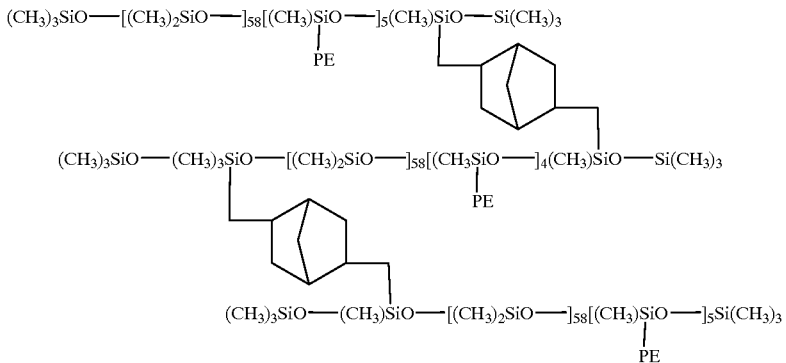

The radical PE is to the extent of

10% the radical $-(CH_2)_3O-(C_2H_4O-)_{16}(C_3H_6O-)_{12}CH_3$ and

55% the radical $-(CH_2)_3O-(C_2H_4O-)_5(C_3H_6O-)_{21}CH_3$ and

10% the radical $-(CH_2)_3O-(C_2H_4O-)_{45}(C_3H_6O-)_{34}CH_3$ and

25% the radical $-(CH_2)_3O-(C_2H_4O-)_{45}(C_3H_6O-)_{34}H$.

Preparation of Block Copolymer 3

| | |
|---|---|
| 120.6 g (0.250 mol) | of siloxane having the following average composition $(CH_3)_3SiO-[(CH_3)_2SiO-]_{58}[(CH_3)HSiO-]_6Si(CH_3)_3$, |
| 21.5 g (0.0146 mol) | of polyether having the following average composition $CH_2=CH-CH_2O-(C_2H_4O-)_{16}(C_3H_6O-)_{12}CH_3$, |
| 121.2 g (0.0803 mol) | of polyether having the following average composition $CH_2=CH-CH_2O-(C_2H_4O-)_5(C_3H_6O-)_{21}CH_3$, |
| 58.9 g (0.0146 mol) | of polyether having the following average composition $CH_2=CH-CH_2O-(C_2H_4O-)_{45}(C_3H_6O-)_{34}CH_3$, |
| 145.9 g (0.0364 mol) | of polyether having the following average composition $CH_2=CH-CH_2O-(C_2H_4O-)_{45}(C_3H_6O-)_{34}H$, |
| 1.5 g (0.0166 mol) | of 2,5-norbornadiene and 313 g of Solvesso 150 | are charged to a flask which is fitted with stirrer, thermometer, gas inlet and reflux condenser. Nitrogen is passed through the apparatus, and the contents of the flask are heated to 90° C. with stirring. Then 0.35 g of a 10% strength solution of $H_2PtCl_6.6H_2O$ in i-propanol is added to the batch. A slightly exothermic reaction ensues. The batch is left to continue reacting. After 6 h the SiH conversion is 98.3% (determined from elimination of hydrogen with n-butanol in an alkaline medium). A clear, yellow solution is obtained which contains 60% by weight of the desired block copolymer. The viscosity of the solution is 870 mPa s. The resulting block copolymer 3 has the following average composition:

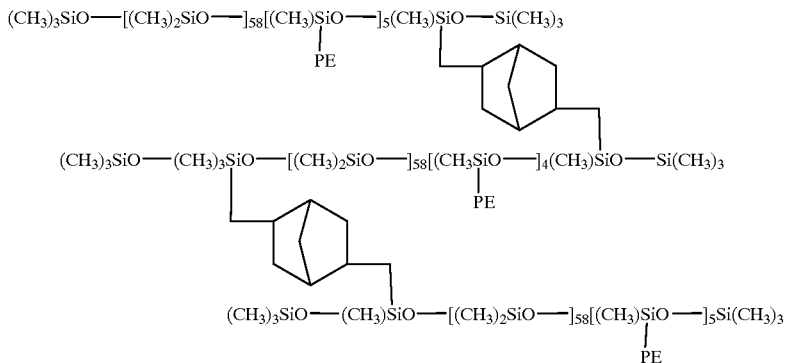

The radical PE is to the extent of

10% the radical $-(CH_2)_3O-(C_2H_4O-)_{16}(C_3H_6O-)_{12}CH_3$ and

55% the radical $-(CH_2)_3O-(C_2H_4O-)_5(C_3H_6O-)_{21}CH_3$ and

10% the radical $-(CH_2)_3O-(C_2H_4O-)_{45}(C_3H_6O-)_{34}CH_3$ and

25% the radical $-(CH_2)_3O-(C_2H_4O-)_{45}(C_3H_6O-)_{34}H$.

Preparation of Block Copolymer 4

Under the same conditions as for the preparation of block copolymer 2,

| | |
|---|---|
| 107.7 g (0.1000 mol) | of siloxane having the following average composition $(CH_3)_3SiO-[(CH_3)_2SiO-]_{9.5}[(CH_3)HSiO-]_{3.5}-Si(CH_3)_3$, |

-continued

| 241.8 g (0.3124 mol) | of polyether having the following average composition $CH_2=CH-CH_2O-(C_2H_4O-)_{11}(C_3H_6O-)_4H$ and |
| --- | --- |
| 4.6 g (0.0500 mol) | of 2,5-norbornadiene | are reacted in the presence of 350 ml of toluene and 15 mg of cis-[PtCl$_2$(NH$_3$)$_2$]. A yellowish product is obtained having a viscosity of 870 mPa s. The resulting block copolymer 4 has the following average composition:

The radical PE is the radical —(CH$_2$)$_3$O—(C$_2$H$_4$O—)$_{11}$(C$_3$H$_6$O—)$_4$H.

$(CH_3)_3SiO-[(CH_3)_2SiO-]_{9.5}[(CH_3)SiO-]_{2.5}(CH_3)SiO-Si(CH_3)_3$
              |
              PE

Preparation of Block Copolymer 5

Stage a)

| 145.5 g (0.2 mol) | of siloxane having the following average composition $H(CH_3)_2SiO-[CH_3)_2SiO-]_8Si(CH_3)_2H$, |
| --- | --- |
| 59.3 g (0.2 mol) | of octamethylcyclotetrasiloxane, |
| 109.3 g (0.2 mol) | of cyclic siloxane of the formula $[CH_3(C_3H_6Cl)SiO-]_4$ and |
| 0.32 g | of trifluoromethanesulfonic acid (99% strength) | are weighed into a flask which is fitted with stirrer, thermometer, gas inlet and reflux condenser and are stirred at 40° C. for 6 h while nitrogen is passed over. Then 6 g of NaHCO$_3$ are added to the batch, and stirring is continued for one hour. The batch is then filtered at room temperature. A siloxane is obtained having the following average composition:

$H(CH_3)_2SiO-[(CH_3)_2SiO-]_{12}[(CH_3)(C_3H_6Cl)SiO-]_4Si(CH_3)_2H$

Stage b)

157.1 g (0.1 mol) of the siloxane obtained in stage a) and 46.1 g (0.5 mol) of 2,5-norbornadiene are charged to a flask which is fitted with stirrer, thermometer, gas inlet and reflux condenser. Nitrogen is passed through the apparatus, and the contents of the flask are heated to 80° C. with stirring. Then 18 mg of Pt$_2$Cl$_4$(C$_6$H$_{10}$)$_2$ are added to the batch, which is stirred for 4 h. Subsequently, SiH-bonded hydrogen can no longer be detected. The 2,5-norbornadiene employed in excess is then removed by distillation at 60° C. under vacuum (about 20 mbar). 0.1 mol of siloxane is obtained having the following average composition:

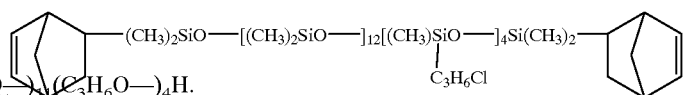

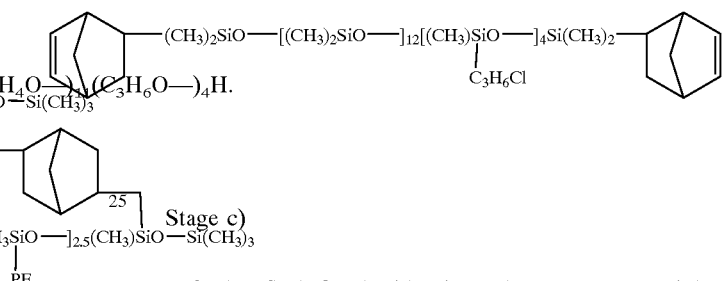

Stage c)

A further flask fitted with stirrer, thermometer, gas inlet and reflux condenser is charged with

| 139.9 g (0.20 mol) | of siloxane having the following average composition $(CH_3)_3SiO-[(CH_3)_2SiO-]_4[(CH_3)HSiO-]_4Si(CH_3)_3$ |
| --- | --- |
| and | |
| 87.2 g (0.66 mol) | of 3-allyloxy-1,2-propanediol. |

Nitrogen is passed through the apparatus, and the contents of the flask are heated to 80° C. with thorough stirring. Then 2.3 g of Na$_2$CO$_3$ and 20 mg of Pt$_2$Cl$_4$(C$_6$H$_{10}$)$_2$ are added to the batch. After 40 minutes the batch has reacted to the extent that the residual SiH content of the flask contents corresponds approximately to that which is established when one SiH group remains per molecule of the siloxane employed. Then the product obtained in stage b) is added completely to the batch and stirring is continued. After 2.5 h the SiH conversion is 97.3% (determined from elimination of hydrogen with n-butanol in an alkaline medium). Finally, the batch is filtered. A clear, yellow liquid is obtained. The resulting block copolymer 5 has the following average composition:

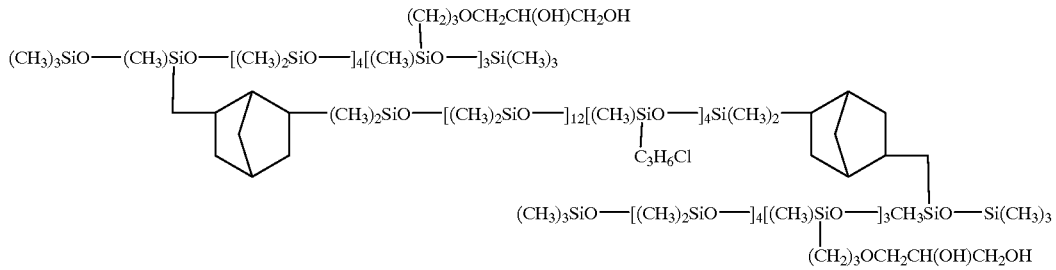

Preparation of Block Copolymer 6

| | |
|---|---|
| 219.8 g (0.037 mol) | of siloxane having the following average composition $(CH_3)_3SiO\text{—}[(CH_3)_2SiO\text{—}]_{60}[(CH_3)HSiO\text{—}]_{22}Si(CH_3)_3$, |
| 41.9 g (0.037 mol) | of siloxane having the following average composition $(CH_3)_3SiO\text{—}[(CH_3)_2SiO\text{—}]_9[(CH_3)HSiO\text{—}]_5Si(CH_3)_3$, |
| 91.8 g (0.185 mol) | of polyether having the following average composition $CH_2\text{=}CH\text{—}CH_2O\text{—}(C_2H_4O\text{—})_6(C_3H_6O\text{—})_3H$, |
| 3.4 g (0.037 mol) | of 2,5-norbornadiene and |
| 575.1 g | of hexyl laurate (as solvent) | are charged to a flask which is fitted with stirrer, thermometer, gas inlet and reflux condenser. Nitrogen is passed through the apparatus, and the contents of the flask are heated to 90° C. with stirring. Then 26 mg of $Pt_2Cl_4(C_6H_{10})_2$ are added to the batch. After 10 minutes the temperature is raised to 115° C. and 218.3 g (0.9725 mol) of 1-hexadecene are added dropwise. During this addition the temperature should not rise above 120° C. Reaction is then allowed to continue for 9 h more. The SiH conversion attains 97.6%. A clear, yellowish solution is obtained having a viscosity of 59 mPas. The solution contains the block copolymer 6, which has the following average composition:

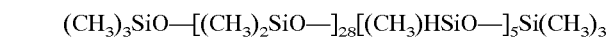

The radical $PE/C_{16}$ is to the extent of

16% the radical $\text{—}(CH_2)_3O\text{—}(C_2H_4O\text{—})_6(C_3H_6O\text{—})_3H$ and 84% the radical $\text{—}C_{16}H_{33}$.

Preparation of Block Copolymer 7

A flask which is fitted with stirrer, thermometer, gas inlet and reflux condenser is charged with 57.1 g (0.50 mol) of allyl glycidyl ether and 4.6 g (0.05 mol) of 2,5-norbornadiene. Nitrogen is passed through the apparatus, and the contents of the flask are heated to 90° C. with stirring. Then 15 mg of $Pt_2Cl_4(C_6H_{10})_2$ are added, after which 254 g of siloxane having the following average composition $$(CH_3)_3SiO\text{—}[(CH_3)_2SiO\text{—}]_{28}[(CH_3)HSiO\text{—}]_5Si(CH_3)_3$$

are added dropwise over one hour. Reaction is then allowed to continue for 3.5 h more, and an SiH conversion of 98.5% is attained. Subsequently, volatile constituents are stripped off under a vacuum of 15 mbar at a bottom temperature of up to 130° C. A yellowish liquid is obtained. 2.03% of epoxy O are found in the product (theoretical: 2.1%). The resulting block copolymer 7 has the following average composition:

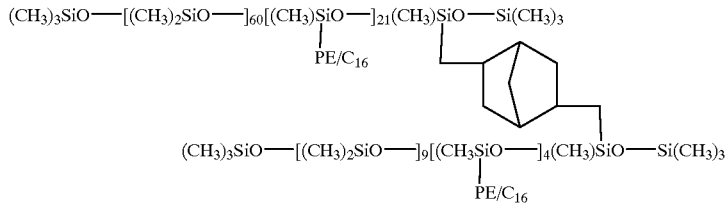

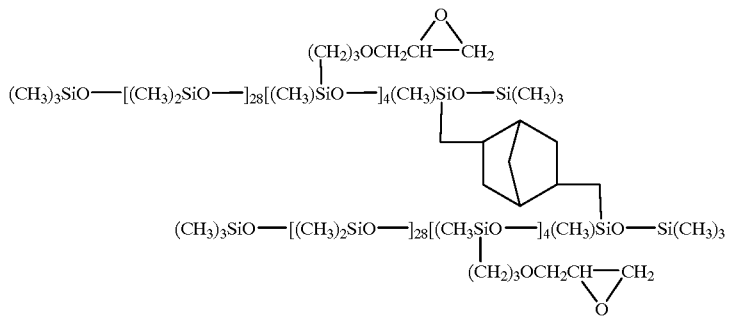

The copolymer 7 has reactive groups and is susceptible to further chemical reactions; for example, it can be used to prepare quats and betaines (in this regard see for example DE-C-34 17 912). Betaines are used, in turn, in cosmetic preparations.

In addition, the following noninventive block copolymers V 1 to V 6 were prepared by known methods which are disclosed in the literature and in patents. (They are used as comparison substances in the performance analyses described subsequently.)

Block Copolymer V 1:

$(CH_3)_3SiO\text{—}[(CH_3)_2SiO\text{—}]_{58}[(CH_3)SiO\text{—}]_6Si(CH_3)_3$
                                              |
                                              PE The radical PE is to the extent of
10% the radical $-(CH_2)_3O-(C_2H_4O-)_{12}CH_3$ and
30% the radical $-(CH_2)_3O-(C_2H_4O-)_5(C_3H_6O-)_{21}CH_3$ and
60% the radical $-(CH_2)_3O-(C_2H_4O-)_{45}(C_3H_6O-)_{34}CH_3$.

Block Copolymer V 2:

$(CH_3)_3SiO\text{—}[(CH_3)_2SiO\text{—}]_{120}[(CH_3)SiO\text{—}]_{12}Si(CH_3)_3$
                                              |
                                              PE The radical PE is to the extent of
10% the radical $-(CH_2)_3O-(C_2H_4O-)_{12}CH_3$ and
30% the radical $-(CH_2)_3O-(C_2H_4O-)_5(C_3H_6O-)_{21}CH_3$ and
60% the radical $-(CH_2)_3O-(C_2H_4O-)_{45}(C_3H_6O-)_{34}CH_3$.

Block Copolymer V 3:

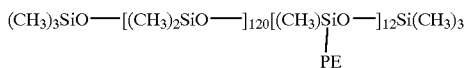

The radical PE is the radical $-(CH_2)_3O-(C_2H_4O-)_{11}(C_3H_6O-)_4H$.

Block Copolymer V 4:

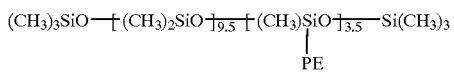

The radical PE is the radical $-(CH_2)_3O-(C_2H_4O-)_{11}(C_3H_6O-)_4H$.

Block Copolymer V 5:

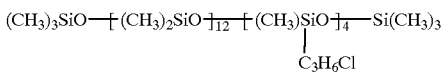

Block Copolymer V 6:

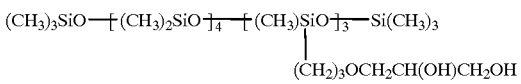

The block copolymers 1, 2, 3, V 1 and V 2 are tested as additives in the following flexible-foam formulation.

| Flexible-foam formulation | |
|---|---|
|  | Parts by weight |
| Polyol (OHN: 46, 11% EO) | 100 |
| Water | 5 |
| Tertiary amine | 0.15 |
| Tin octoate | 0.23 |
| Physical blowing agent | 5 |
| Stabilizer | varies |
| Isocyanate T 80 | 63.04 |

In the course of foaming, 300 g of polyol are employed. The other formulation constituents are calculated accordingly.

For testing the additive as stabilizer, polyol, water, amine, tin octoate, stabilizer and blowing agent are mixed with thorough stirring. Following the addition of the isocyanate, the mixture is stirred at 3000 rpm for 7 seconds and is poured into a wooden box (base area 27 cm×27 cm) lined with paper. For testing the additive in respect of other properties, for example as a cell regulator, it is of course also possible to use another stabilizer as well. A foam is formed, on which the following data are measured for assessing the stabilizer employed:

1. The settling of the foam at the end of the ascending phase (referred to in the following table as settling).
2. The number of cells per centimeter of foam is counted under a microscope.

The results obtained in the course of foaming are stated in Table 1. The results show that, relative to the noninventive block copolymers V 1 and V 2, the innovative additives 1, 2 and 3 bring about an otherwise unattainable combination of low settling and good fine-celled quality, which has also been confirmed on foaming with pressurized inert gases.

TABLE 1

| Use of copolymer | Parts by weight | Settling [cm] | Cells per cm |
|---|---|---|---|
| 1 | 0.6/0.5 | 0/0.4 | 15/15 |
| V 1 | 0.6/0.5 | 0.5/0.6 | 13/12 |
| V 2 | 0.6/0.5 | 0.3/0.6 | 13/12 |
| 2 | 0.6/0.5 | 0.2/0.4 | 15/14 |
| 3 | 1.0/0.8[1)] | 0.4/0.7 | 16/16 |

[1)]Copolymer as 60% formulation in Solvesso

The block copolymers 4, V 3 and V 4 are tested as additives in the following rigid-foam formulation.

Rigid-foam formulation

| | parts by weight |
|---|---|
| Polyol (sugar-started polyol, OHN: 520) | 100 |
| Water | 1.5 |
| Tertiary amine | 2.2 |
| Physical blowing agent | 28 |
| Stabilizer | 1.5 |
| Crude MDI (polymeric diphenylmethane 4,4'-diisocyanate containing 31.1% NCO) | 167 |

In the course of foaming, 100 g of polyol are employed.

The rigid polyurethane foams are produced by customary techniques in a board mold having the dimensions length 145 cm, width 14 cm, thickness 3.5 cm. Polyol, water, amine, stabilizer and blowing agent are mixed thoroughly with stirring. Following the addition of the isocyanate, the mixture is stirred at 2500 rpm for 6.5 seconds. The reaction mixture is then introduced into the lower part of the mold, said mold being inclined by 45°. In order to assess the flowability of the foam, the size of the foam charge is chosen such that the mold is underfilled. The resulting rigid-foam board is used to test the following properties for assessing the stabilizer employed:

1. The length of the foam board as a measure of the flowability.

2. Surface defects in the resulting foam board (grading of assessment: virtually none, slight, moderate, severe, very severe).

3. Base zone of the foam board (grading of assessment: virtually none, slight, moderate, severe, very severe).

4. Internal defects in the cut-open foam board (grading of assessment: virtually none, slight, moderate, severe, very severe).

5. Pore structure of the cut-open foam board (grading of assessment: extra fine, very fine, fine, slightly coarser, coarser, coarse).

The results obtained in foaming are given in Table 2. The advantages of the novel structural principle are also evident in the preparation of a rigid-foam material. Thus when using the novel copolymer 4 rather than using the noninventive copolymers V 3 and V 4 an otherwise unattainable, advantageous combination is obtained of very good flowability and relatively minor foam defects.

TABLE 2

| Use of copolymer | Flowability [cm] | Surface defects | Base zone defects | Internal defects | Pore structure |
|---|---|---|---|---|---|
| 4 | 133 | moderate | moderate | moderate - severe | very fine - fine |
| V 3 | 131 | moderate - severe | moderate | moderate | very fine - fine |
| V 4 | 133 | severe | moderate - severe | severe | very fine - fine |

The block copolymers 4, 5, 7, V 5 and V 6 are tested as coatings additives. For testing the performance properties the modified silicones are admixed to an air-curing coating system in an amount of 1%. by weight and the mixture is applied with a 40 micrometer wire doctor blade to a Bonder steel panel. The coating is cured at 20° C. for 2 days and then tested for its release properties by means of a peel test using Tesaband 4154 tape. A measure of the scratch resistance of the resulting coatings is the tensile force necessary to pull a 500 g specimen, which rests on three screws, over the coating at a rate of 30 cm per minute. Subsequently, to test the stability of the coatings properties, the coating is rinsed for 10 minutes under running water which is at 20° C. and after the coating has dried the release properties and the scratch resistance are measured again as described above. The results are compiled in Table 3.

TABLE 3

| Coating with 1% by weight of copolymer: | Release [N] | Scratch test [N] | Miscibility | Release after washing [N] | Scratch test after washing [N] |
|---|---|---|---|---|---|
| Coating without additive | 11.6 | 3.2 | | 11.7 | 3.2 |
| V 5 | 3.7 | 0.9 | poor | 9.8 | 3.0 |
| V 6 | 8.2 | 2.7 | good | 8.4 | 2.7 |
| 4 | 5.1 | 1.4 | good | 5.3 | 1.6 |
| 5 | 4.8 | 1.1 | good | 5.0 | 1.3 |
| 7 | 4.3 | 1.2 | satisfactory | 4.3 | 1.3 |

It is evident that the novel substances give the coating material both antiscratch properties and abhesive properties. Through the nature of the substituents and the proportion of the silicone chain to the number and polarity of the substituents it is possible to adapt the polarity of the additive, and thus also its miscibility with the coating formulation used, to the respective polarity of the coating system. In this context, the novel products offer distinct advantages in terms of the attempt to combine abhesive and antiscratch properties on the one hand with good miscibility and durability on the other.

The block copolymer 6 (50% strength by weight in hexyl laurate) is used to prepare a W/O emulsion.

The following constituents are weighed into a glass vessel which is fitted with a stirrer:

2.0 g of block copolymer 6

0.5 g of triglycerol trioleate 8.5 g of octamethylcyclotetrasiloxane 4.0 g of isopropyl myristate and 5.0 g of vaseline DAB* 8

*[DAB—German Pharmacopeial]

After gentle heating and with stirring, a solution of 79 g of water and 2 g of NaCl is slowly added. The resulting W/O emulsion is stirred until it reaches room temperature. The emulsion obtained has a creamy consistency and is stable over an observation period of two months, stored at 20° C. and 45° C. Even after cooling to −25° C. and then thawing it to room temperature, it remains stable. The emulsion is distributed well on the skin and possesses a good assimilation capacity.

What is claimed is:

1. A block copolymer of the following general average formula:

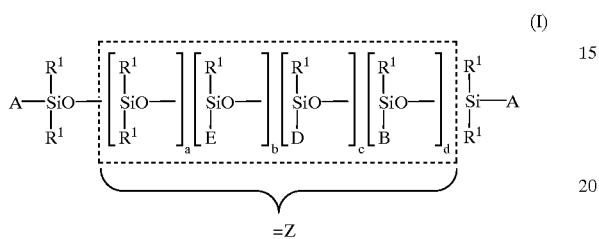

in which the groups and indices have the following meaning:

A=an $R^1$ group, a group E, or a group of one of the following formulas:

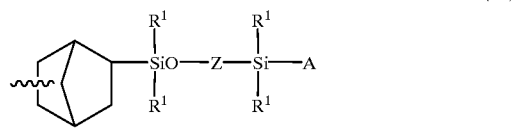

group

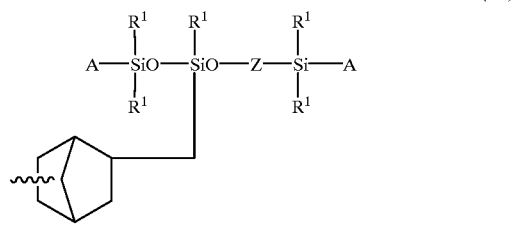

B=radical of the formula IIa or IIb

D=radical of formula

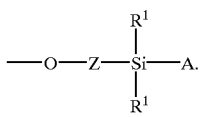

$R^1$=an alkyl group having 1 to 30 carbon atoms, a substituted alkyl group, an optionally substituted aryl group or an optionally substituted alkaryl group, with at least 80% of the $R^1$ groups being methyl groups, a is from 3 to 200, b is from 0 to 50, c is from 0 to 10 and d is from 0 to 5, it being possible for the values of a, b, c and d in the individual segments Z of the radicals A, B and D to be different, E=radical which is
 a) a group of the general formula

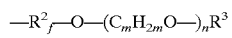

where
 $R^2$ is a divalent alkyl group, which can also be branched, and
 f is 0 or 1,
 m is on average 2 to 4,
 n is from 0 to 100 and
 $R^3$ is a hydrogen group, an optionally substituted alkyl group having 1 to 6 carbon atoms, an acyl group or the group —O—CO—NH—$R^4$ in which $R^4$ is an optionally substituted alkyl or aryl group, and/or
 b) is an epoxy-functionalized alkyl substituent which optionally contains heteroatoms, and/or
 c) is a mono-, di- and trihydroxyalkyl substituent which can also be aromatic or branched and partially or completely etherified or esterified, and/or
 d) is a halo- or pseudohalo-substituted alkyl, aryl or aralkyl group which optionally can also be branched,
with the proviso that at least one radical of the formula IIa or IIb is present in the molecule.

2. A block copolymer as claimed in claim 1 wherein E is present and is a radical of the formula —$R_f^2$—O—$(C_mH_{2m}O—)_nR^3$.

3. A block copolymer according to claim 1 wherein (a+b+d)/b is greater than 5 but less than 20.

4. A method for reducing the surface tension of a liquid which comprises adding a block copolymer as claimed in claim 1.

5. A block copolymer according to claim 2 wherein the copolymer is the

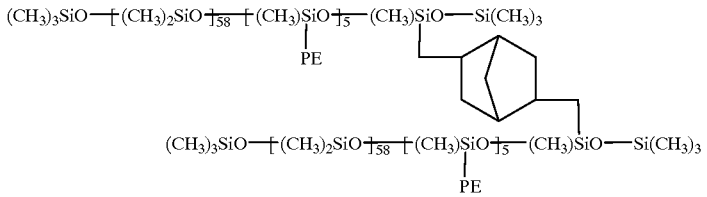

wherein the radical PE is

10% the radical —$(CH_2)_3O$—$(C_2H_4O—)_{12}CH_3$ and

30% the radical —$(CH_2)_3O$—$(C_2H_4O—)_5(C_3H_6O—)_{21}CH_3$ and

60% the radical —$(CH_2)_3O$—$(C_2H_4O—)_{45}(C_3H_6O—)_{34}CH_3$.

6. A method of producing polyurethane foam utilizing a block copolymer as claimed in claim 1 as an additive.

* * * * *